(12) United States Patent
Guo et al.

(10) Patent No.: US 9,130,710 B2
(45) Date of Patent: Sep. 8, 2015

(54) METHOD AND SYSTEM FOR PROCESSING CONTROL CHANNEL INFORMATION (75) Inventors: Senbao Guo, Shenzhen (CN); Yunfeng Sun, Shenzhen (CN); Yuhong Gong, Shenzhen (CN); Dongli Chen, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 69 days.

(21) Appl. No.: 14/007,152

(22) PCT Filed: Mar. 2, 2012

(86) PCT No.: PCT/CN2012/071886
§ 371 (c)(1),
(2), (4) Date: Dec. 9, 2013

(87) PCT Pub. No.: WO2012/130013
PCT Pub. Date: Oct. 4, 2012

(65) Prior Publication Data
US 2014/0177547 A1 Jun. 26, 2014

(30) Foreign Application Priority Data
Mar. 30, 2011 (CN) .......................... 2011 1 0079078

(51) Int. Cl.
H04L 5/00 (2006.01)
H04W 72/04 (2009.01)
H04L 25/02 (2006.01)

(52) U.S. Cl.
CPC ............ *H04L 5/0037* (2013.01); *H04L 5/0053* (2013.01); *H04L 5/0094* (2013.01); *H04L25/0238* (2013.01); *H04W 72/042* (2013.01); *H04L 5/001* (2013.01); *H04L 5/0007* (2013.01); *H04L 5/0023* (2013.01); *H04L 5/0048* (2013.01)

(58) Field of Classification Search
None
See application file for complete search history.

(56) References Cited

U.S. PATENT DOCUMENTS

2010/0273506 A1* 10/2010 Stern-Berkowitz et al. .......................... 455/456.1
2011/0243066 A1* 10/2011 Nayeb Nazar et al. ....... 370/328
(Continued)

FOREIGN PATENT DOCUMENTS

| CN | 101478808 A | 7/2009 |
| CN | 101616484 A | 12/2009 |

(Continued)

OTHER PUBLICATIONS

3GPP TSG RAN WG1 Meeting #62, Considerations on PDCCH Blind Decoding in Carrier Aggregation, LG Electronics, Madrid, Spain, Aug. 23, 2010.
(Continued)

*Primary Examiner* — Kerri Rose
(74) *Attorney, Agent, or Firm* — Oppedahl Patent Law Firm LLC (57) ABSTRACT

The disclosure discloses a method and system for processing control channel information. A receiving side is notified, by a network side via one or more types of the following signaling, of the information required to receive or perform blind detection for a control channel, wherein the signaling part comprises at least: a Radio Resource Control (RRC) signaling, a System Information Block (SIB)x (x=2, 3) signaling, and a Physical Downlink Control Channel (PDCCH) signaling located at the first n (n=1, 2, 3, 4) Orthogonal Frequency-Division Multiplexing (OFDM) symbols. In the control channel information processing technology of the disclosure, the receiving side can be notified, via signaling configuration, of at least the time domain or frequency domain location occupied by the control channel. This scheme allows for full utilization of space division technology, thus reducing the load on a physical downlink control channel, and reducing interference between control channels.

16 Claims, 4 Drawing Sheets 410
a network side maintains a RRC signaling, a SIB signaling or downlink control signaling configuration in a PDCCH 420
the network side notifies, through the RRC signaling, the SIB signaling or the downlink control signaling configuration in the PDCCH, a receiving side of information required to receive or perform blind detection for a control channel, wherein the signaling part comprises: a RRC signaling; a SIBx (x=2, 3) signaling, and a PDCCH signaling located at the first n (n=1, 2, 3, 4) OFDM symbols

(56) References Cited

U.S. PATENT DOCUMENTS

| | | | |
|---|---|---|---|
| 2011/0305161 A1* | 12/2011 | Ekpenyong et al. | 370/252 |
| 2012/0082130 A1 | 4/2012 | Xue | |
| 2012/0127948 A1* | 5/2012 | Chung et al. | 370/329 |
| 2012/0155561 A1 | 6/2012 | Seo | |
| 2013/0034070 A1* | 2/2013 | Seo et al. | 370/329 |
| 2013/0077590 A1 | 3/2013 | Xue | |
| 2013/0201932 A1* | 8/2013 | Ko et al. | 370/329 |
| 2013/0230013 A1* | 9/2013 | Seo et al. | 370/329 |
| 2013/0235839 A1* | 9/2013 | Kim et al. | 370/329 |

FOREIGN PATENT DOCUMENTS

| | | |
|---|---|---|
| CN | 101714892 A | 5/2010 |
| CN | 101932077 A | 12/2010 |
| CN | 102123432 A | 7/2011 |
| CN | 102263616 A | 11/2011 |
| EP | 2293633 A1 | 3/2011 |
| EP | 2445289 A1 | 4/2012 |
| WO | 2010145532 A1 | 12/2010 |
| WO | 2011021852 A2 | 2/2011 |

OTHER PUBLICATIONS

Supplementary European Search Report in European application No. 12763566.2, mailed on Aug. 28, 2014.

International Search Report in international application No. PCT/CN2012/071886 mailed on Jun. 7, 2012.

English Translation of the Written Opinion of the International Search Authority in international application No. PCT/CN2012/071886, Jun. 7, 2012.

* cited by examiner

METHOD AND SYSTEM FOR PROCESSING CONTROL CHANNEL INFORMATION

TECHNICAL FIELD

The disclosure relates to the field of communications, and in particular to a method and system for processing control channel information.

BACKGROUND

In Release (R) 8/9 of a Long Term Evolution (LTE) system, a Common Reference Signal (CRS) is designed in order to measure the quality of a channel and demodulate a received data symbol. A User Equipment (UE) may measure the channel through the CRS so that the UE is supported to perform cell reselection and to switch to a target cell and the quality of a channel is measured when the UE is in a connected state. A connection may be disconnected by a physical layer via a high layer-related wireless link connection failure signaling at a relative higher interference level. In LTE R10, in order to further improve the average spectrum utilization of cells, the spectrum utilization of cell edges and the throughput of each UE, two types of reference signals are defined respectively: a Channel State Information-Reference Signals (CSI-RS) and a Demodulation Reference Signals (DMRS), wherein the CSI-RS is applied to channel measurement, a Precoding Matrix Indicator (PMI), a Channel Quality Indicator (CQI) and a Rank Indicator (RI) need to be fed back by an UE to an Evolved Node B (eNB) may be calculated by the measurement to the CSI-RS, The DMRS is applied to demodulation of a Downlink Shared Channel (DSC), and the DMRS demodulation may use a beam scheme to reduce interference between different receiving sides and different cells, reduce performance reduction caused by codebook granularity and reduce the cost of a downlink control signaling to a certain extent.

In LTE R8, R9 and R10, Physical Downlink Control Channels (PDCCH) are mainly distributed in the first 1, 2 or 3 Orthogonal Frequency-Division Multiplexing (OFDM) symbols of a subframe and specific distribution needs to be configured according to different subframe types and the number of CRS ports, as shown in Table 1.

TABLE 1

| Subframe | Number of PDCCH OFDM symbols ($N_{RB}^{DL} > 10$) | Number of PDCCH OFDM symbols ($N_{RB}^{DL} \leq 10$) |
|---|---|---|
| Subframe 1 and subframe 6 in subframe type 2 | 1, 2 | 2 |
| a Multicast-Broadcast Single Frequency Network (MBSFN) subframe on Physical Downlink Shared Channel (PDSCH)-supported carrier, a CRS is configured as 1 port or 2 ports | 1, 2 | 2 |
| a MBSFN subframe on PDSCH-supported carrier, a CRS is configured as 4 ports | 2 | 2 |
| a subframe on transmission carrier not supporting PDSCH | 0 | 0 |
| a Non-MBSFN subframe (except subframe 6 of frame structural type 2) configured as Positioning Reference Signal (PRS) | 1, 2, 3 | 2, 3 |
| All other conditions | 1, 2, 3 | 2, 3, 4 |

Each receiving side needs to perform blind detection according to the first 3 symbols, the initial location of blind detection, and the number of elements of a control channel are related to the Radio Network Temporary Identities (RNTI) allocated to receiving sides and different control information. Generally, the control information may be divided into common control information and dedicated control information. The common control information is generally put in a common search space of a PDCCH while the dedicated control information may be put in a common space and a dedicated search space. After blind detection, the receiving side determines whether there is a common system message, downlink scheduling information or uplink scheduling information in a current subframe. Since such downlink control information lacks Hybrid Automatic Repeat Request (HARQ) feedback, a bit error ratio as low as possible needs to be ensured in the detection.

In an LTE R10 heterogeneous network, since different types of base stations have relatively strong interference, in consideration of interference problem to a Pico by a Macro eNB as well as the interference problem to a Macro eNB by a Home eNB, it is put forward that the problem of mutual interference between different types of base stations is solved by a resource muting scheme. A specific resource muting scheme may be divided into a muting scheme based on a subframe, e.g. an Almost Blank Subframe (ABS) scheme, or may further be a resource element-based scheme, e.g. a CRS muting scheme.

However, the schemes above not only increase resource waste, but also greatly limit scheduling, especially when ABS configuration of a Macro eNB is considered. More ABSs will be configured by the Macro eNB if more Picos are distributed, which will greatly influence the Macro eNB to increase scheduling delay while increasing resource waste. In addition, the interference problem of CRS resources and data resources cannot be solved, the interference between the data resources cannot be solved by the muting CRS scheme either. In addition, the schemes above, with bad backward compatibility, may need more standardization efforts while increasing access delay.

More users may be introduced in LTE R11 to perform transmission on a MBSFN subframe, which will result in capacity deficiency of 2 OFDM symbols of a PDCCH which is applied to bearing and configured by a MBSFN. In order to guarantee backward compatibility for R8/R9/R10 users, new resources for transmitting control information need to be explored on PDSCH resources. In addition, a Coordinated Multi-Point Transmission (COMP) technology is introduced in R11. Such technology can solve the interference problem between different types of cells by a space division scheme, save resource cost, avoid resource waste caused by muting, and reduce limitations on scheduling. However, the problem cannot be solved by the space division scheme according to present time domain PDCCH mode. In addition, considering the backward compatibility for R8 and R9, such control channel as a time domain PDCCH must be retained. In this case, how to solve the interference between control channels by space division technology needs to be studied carefully.

SUMMARY

In view of this, the main purpose of the disclosure is to provide a method and system for processing control channel information, so that a network side can notify, through signaling configuration, the time domain and/or frequency domain location occupied by a control channel to a receiving side, so as to allow for full utilization of space division technology and reduce interference between control channels.

To realize the purpose above, the technical solution of the disclosure is realized by the following way:

a method for processing control channel information at least includes: a receiving side is notified, by a network side via one or more types of the following signalings, of the information required to receive or perform blind detection for a control channel;

wherein the signaling part includes at least:
a Radio Resource Control (RRC) signaling,
a System Information Block (SIB)x (x=2, 3) signaling, and
a PDCCH signaling located at the first n (n=1, 2, 3, 4) OFDM symbols;

wherein the information required by the receiving side to receive or perform blind detection for the control channel at least includes one or more types of the following information:

the time domain and/or frequency domain location occupied by the control channel which needs to be received or subjected to blind detection, wherein at least includes a resource allocation type and resource time domain and/or frequency domain location information;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection, wherein the notifying includes:
notifying a receiving side to receive or perform blind detection for downlink control information in a PDCCH region and/or a PDSCH region; and/or notifying, by the network side through the RRC signaling, the receiving side that the receiving side is needed to receive or perform blind detection for the downlink control information in the PDCCH region or receive or perform blind detection for the downlink control information in the PDSCH region; and/or notifying, by the network side through the RRC signaling or the SIBx (x=2,3) signaling, the receiving side of the information required by the control channel which needs to be received or subjected to blind detection.

wherein when performing the notification by the network side through the RRC signaling or the SIBx (x=2,3) signaling, further notifies, through a resource allocation scheme Type 0, Type 1 or Type 2 and/or a bitmap scheme, the receiving side of the frequency domain location of the control information which needs to be received or subjected to blind detection in the PDSCH region, wherein the notifying includes:
indicating, by the network side through a higher layer signaling, the receiving side of the time domain location of the downlink control information which needs to be received or subjected to blind detection by the network side; and/or indicating, by the network side through a higher layer signaling, the receiving side of an OFDM initial location of the downlink control information which needs to be received or subjected to blind detection in the PDSCH time domain location; and/or notifying, by the network side through a Physical Control Format Indicator Channel (PCFICH) signaling, the receiving side of the time domain location of the downlink control information which needs to be received or subjected to blind detection in the PDSCH; determining, by the receiving side through receiving or performing blind detection for a PCFICH, an OFDM initial symbol of the downlink control information of the PDSCH region; and/or determining, by the network side, the OFDM initial symbol or an OFDM ending symbol of the downlink control information by the initial or ending OFDM symbol location of a slot, or determining the OFDM initial or ending symbol of the downlink control information by the initial or ending OFDM symbol location of a subframe, wherein the notifying includes:
notifying, by the network side, the receiving side of the control information through configuring two levels of downlink control information; obtaining, by the receiving side through receiving or performing blind detection for a primary control signaling in a PDCCH, the information required to receive or perform blind detection for a secondary downlink control channel in the PDSCH region, wherein the information required to perform blind detection for secondary control information is the same as or a sub-set of the information required by the receiving side to receive or perform blind detection for the control channel, wherein when the network side configures the frequency domain location of the secondary downlink control information indicated in the primary downlink control information, the following scheme is applied: applying the resource allocation scheme Type 0, Type 1 or Type 2 and/or the bitmap scheme, wherein the method further includes:
pre-notifying, by the network side through the RRC signaling, the frequency domain location of the downlink control information transmitted in a predetermined PDSCH region;

the Type 0, Type 1 or Type 2 and/or the bitmap resource allocation scheme is applicable to the frequency domain location of the downlink control information transmitted in the predetermined PDSCH region;

selecting, in the primary downlink control information, the frequency domain resource location of the PDSCH region of the secondary downlink control information from predetermined PDSCH region resource indicated by the RRC signaling, wherein the method further includes:
notifying, when the network side sending a common control information to receiving sides which are provided with or configured to receive or perform blind detection for the control information on a PDSCH, these receiving sides of corresponding common control information through the RRC signaling, and/or, putting the common control information of the receiving sides in the PDCCH region, and/or putting the common control information of the receiving sides in the PDSCH region;

obtaining, by the receiving side, the common control information through receiving the RRC signaling sent by the network side, or obtaining the common control information through receiving or performing blind detection for the PDCCH, receiving or performing blind detection for a dedicated control information in the PDCCH region and/or the PDSCH region, or performing blind detection for the common control information in the PDSCH region, wherein the method further includes:

applying any one of the following three schemes when the network side configures to send the common control information in the PDSCH region:

indicating, by the network side through configuring a common control information non-dedicated RRC signaling, a receiving or blind detection region of the common control information and the dedicated control information;

indicating, by the network side through configuring a common control information dedicated RRC signaling, a receiving or blind detection region of the common control information;

putting, by the network side, the common control information according to a PDSCH region configured fixedly by a standard;

further obtaining, by the receiving side, the location of the common control information through a common control channel non-dedicated signaling, or a common control channel dedicated signaling, or a fixed region in the standard, so as to perform receiving or blind detection processing, wherein the method further includes:

configuring, by the network side, the time domain length of the control channel of the PDSCH region by taking a slot or a subframe as a unit, wherein the method further includes:

sending, by the network side, a Downlink Grant information (DL-Grant) and/or Uplink Grand information (UL-Grant) on the first slot of the PDSCH region; or sending the DL-Grant on the first slot of the PDSCH region and sending the UL-Grant on a second slot; or sending the DL-Grant on the first slot of the PDSCH region and sending the UL-Grant in the PDCCH region; or sending the UL-Grant in the PDCCH region and sending the DL-Grant on two slots of the PDSCH region; or sending the UL-Grant in the PDCCH region, and sending the DL-Grant on the first slot of the PDSCH region; or putting the DL-Grant and UL-Grant on both the first slot and the second slot, and an allocated time domain granularity is a slot.

A system for processing control channel information at least includes a signaling maintenance unit, and a receiving or blind detection notification unit, wherein the signaling maintenance unit is configured to maintain downlink control signaling configuration in a PDCCH, a RRC signaling or a SIB signaling;

the blind detection notification unit is configured to, through the maintained downlink control signaling configuration, the RRC signaling or the SIB signaling in the PDCCH, notify a receiving side of information required to receive or perform blind detection for a control channel;

wherein the signaling part includes at least:

a RRC signaling, a SIBx (x=2, 3) signaling, and a PDCCH signaling located at the first n (n=1, 2, 3, 4) OFDM symbols;

wherein the information required by the receiving side to receive or perform blind detection for the control channel at least includes one or more types of the following information:

the time domain and/or frequency domain location occupied by the control channel which needs to be received or subjected to blind detection, wherein at least includes a resource allocation type and resource time domain and/or frequency domain location information;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

wherein, when notifies, the blind detection notification unit is configured to:

notifying a receiving side to receive or perform blind detection for downlink control information in a PDCCH region and/or a PDSCH region; and/or trigger the network side to notify, through the RRC signaling, the receiving side that the receiving side is needed to receive or perform blind detection for the downlink control information in the PDCCH region; or receive or perform blind detection for the downlink control information in the PDSCH region; and/or trigger the network side to notify, through the RRC signaling or the SIBx (x=2,3) signaling, the receiving side of the information required by the downlink control information which needs to be received or subjected to blind detection;

the information required to receive or perform blind detection for the downlink control information at least includes one or more types of the following information:

the time domain and/or frequency domain location occupied by the control channel which needs to be received or subjected to blind detection, wherein at least includes a resource allocation type and resource time domain and/or frequency domain location information;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection, wherein when performing the notification through the RRC signaling or the SIBx (x=2,3) signaling, the network side is further configured to notify, through a resource allocation scheme Type 0, Type 1 or Type 2 or a bitmap scheme, the receiving side of the frequency domain location of the downlink control information which needs to be received or subjected to blind detection in the PDSCH region, wherein when notifies, the blind detection notification unit is configured to:

trigger the network side to indicate, through a higher layer signaling, the receiving side of the time domain location of the downlink control information which needs to be received or subjected to blind detection in the PDSCH; and/or trigger the network side to indicate, through a higher layer signaling, the receiving side of an OFDM initial location of the downlink control information which needs to be received or subjected to blind detection in the PDSCH time domain location; and/or trigger the network side to notify, through a PCFICH signaling, the receiving side of the time domain location of the downlink control information which needs to be received or subjected to blind detection in the PDSCH, and trigger the receiving side to determine, through receiving or performing blind detection for a PCFICH, an OFDM initial symbol of the control information of the PDSCH region; and/or trigger the network side to determine the OFDM initial symbol or an OFDM ending symbol of the downlink control information by the initial or ending OFDM symbol location of a slot, or determine the OFDM initial or ending symbol of the downlink control information by the initial or ending OFDM symbol location of a subframe, wherein when notifies, the blind detection notification unit is configured to:

trigger a network side to notify a downlink control information format to the receiving side through configuring two levels of downlink control information; trigger the receiving side to obtain, through receiving and performing blind detection for a primary control signaling in a PDCCH, one or more types of the following information of secondary downlink control information which needs to be subjected to blind detection in the PDSCH region:

the time domain or frequency domain location occupied by the control channel which needs to be received or subjected to blind detection, wherein at least includes a resource allocation type and resource time domain and/or frequency domain location information;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection, wherein when configuring the frequency domain location of the secondary downlink control information indicated in the primary downlink control information, the network side is configured to apply the following scheme: the resource allocation scheme Type 0, Type 1 or Type 2 or the bitmap scheme, wherein the network side is further configured to:

pre-notify, through the RRC signaling, the frequency domain location of the downlink control information transmitted in a predetermined PDSCH region;

the Type 0, Type 1 or Type 2 or the bitmap resource allocation scheme is applicable to the frequency domain location of the downlink control information transmitted in the predetermined PDSCH region;

in the primary downlink control information, select the frequency domain resource location of the PDSCH region of the secondary downlink control information from the frequency domain location of the predetermined PDSCH region, wherein the network side is further configured to:

when sending a common control information to receiving sides which are provided with or configured to receive or perform blind detection for the downlink control information on a PDSCH, notify these receiving sides of corresponding common control information through the RRC signaling, and/or, put the common control information of the receiving sides in the PDCCH region, and/or put the common control information of the receiving sides in the PDSCH region;

trigger the receiving side to obtain the common control information through receiving the RRC signaling sent by the network side, or obtain the common control information through receiving or performing blind detection for the PDCCH, receive or perform blind detection for a dedicated control information in the PDCCH region and/or the PDSCH region, or perform blind detection for the common control information in the PDSCH region, wherein the network side is further configured to:

apply any one of the following three schemes when the common control information is configured to be sent in the PDSCH region:

indicate, through configuring a common control information non-dedicated RRC signaling, a receiving or blind detection region of the common control information and the dedicated control information;

indicate, through configuring a common control information dedicated RRC signaling, a receiving or blind detection region of the common control information;

put the common control information according to a PDSCH region configured fixedly by a standard;

trigger the receiving side to obtain the location of the common control information through a common control channel non-dedicated signaling, or a common control channel dedicated signaling, or a fixed region in the standard, so as to perform receiving or blind detection processing, wherein the network side is further configured to:

configure a control channel of the PDSCH region for the receiving side by applying a time domain length taking a slot or a subframe as a unit, wherein the network side is further configured to:

send a DL-Grant and/or UL-Grant on the first slot of the PDSCH region; or send the DL-Grant on the first slot of the PDSCH region and send the UL-Grant on a second slot; or send the DL-Grant on the first slot of the PDSCH region and send the UL-Grant in the PDCCH region; or send the UL-Grant in the PDCCH region and send the DL-Grant on two slots of the PDSCH region; or put the DL-Grant and UL-Grant on both the first slot and the second slot, and an allocated time domain granularity is a slot.

In the control channel information processing technology of the disclosure, the receiving side can be notified, via signaling configuration, of the time domain and/or frequency domain location occupied by the control channel. This scheme allows for full utilization of space division technology, thus reducing the load on a physical downlink control channel, and reducing interference between control channels.

DETAILED DESCRIPTION

In practical application, a receiving side may be notified by a network side via a type or various types of following signalings of information required by a control channel which needs to be received, wherein the signaling part at least includes:

a RRC signaling, a SIBx (x=2, 3) signaling, and a PDCCH signaling located at the first n (n=1, 2, 3) OFDM symbols, wherein the notified control channel information at least includes:

a signaling indicating that the receiving side may receive or perform blind detection for downlink control information in a PDSCH region;

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

Specifically, a receiving side or network side of an advanced version may notify, through a RRC signaling, that the receiving side may operate under a mode. The receiving side under such a mode may perform blind detection for the downlink control information in a PDCCH region and/or PDSCH region. Or, the network side may directly notify, through a RRC signaling, whether the receiving side needs to perform blind detection for the downlink control information in the PDCCH region or the PDSCH region. Such a RRC signaling may be implicit or explicit, e.g. the receiving side may be notified implicitly by configuring the receiving side to operate under a certain transmission mode, or notified explicitly by adding a RRC signaling to operate under which control channel detection mode.

The downlink control information which may be notified to the receiving side by the network side through the RRC signaling or the SIBx (x=2,3) signaling and needs to be received or subjected to blind detection at least includes one or more types of the following information:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

Figure 1:
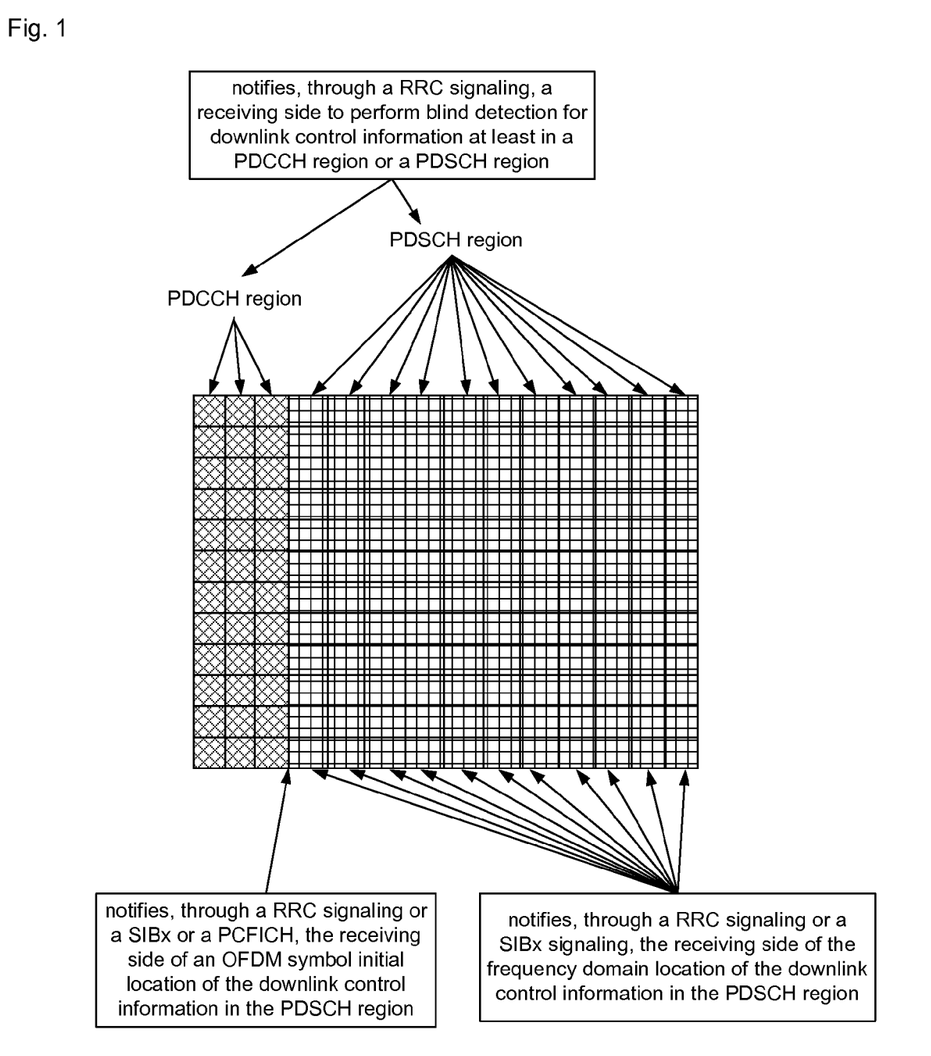
FIG. 1 is the first schematic diagram illustrating a configuration principle of a downlink control channel of an embodiment of the disclosure.

Specifically, the network side may notify, through the RRC signaling or the SIBx (x=2,3) signaling and according to a resource allocation scheme Type 0, Type 1 or Type 2 or a bitmap scheme, the receiving side of the frequency domain location of the downlink control information which needs to be subjected to blind detection in the PDSCH region. Or, the network side may notify, through the RRC signaling or the SIBx (x=2,3) signaling, the receiving side of the PDSCH time domain or frequency domain location of the downlink control information which needs to be subjected to blind detection. The network side may further notify, through a PCFICH signaling, the receiving side of the PDSCH time domain location of the downlink control information which needs to be subjected to blind detection; the receiving side may determine an OFDM initial symbol of the downlink control information of the PDSCH region by receiving or performing blind detection for a PCFICH, as shown in FIG. 1.

Further, the receiving side of an advanced version always operates under a mode or the network side may configure the receiving side to operate under a mode; the network side under such a mode may notify the receiving side of a downlink control information format through configuring two levels of downlink control information; the receiving side may obtain, through performing blind detection for or receiving a primary control signaling in a PDCCH, one or more types of the following information of secondary downlink control information which needs to be received or subjected to blind detection in the PDSCH domain:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

Specifically, when configuring the frequency domain location of the secondary downlink control information indicated in the primary downlink control information, the network side may apply the resource allocation scheme Type 0, Type 1 or Type 2 or the bitmap scheme. The network side may further pre-notify, through the RRC signaling, the frequency domain location of the downlink control information designated to be transmitted in the PDSCH region. The frequency domain location of the downlink control information transmitted in the predetermined PDSCH region may apply the Type 0, Type 1 or Type 2 or the bitmap resource allocation scheme. In addition, the frequency domain resource location of the PDSCH region of the secondary downlink control information may be selected from the frequency domain location of the predetermined PDSCH region through the Type 0, Type 1 or Type 2 or the bitmap (bit mapping diagram) resource allocation scheme in the primary downlink control information.

It should be noted that when sending common control information to receiving sides provided with or configured to receive or perform blind detection for the downlink control information on the PDSCH, the network side notifies these receiving sides of corresponding common control information through the RRC signaling, and/or puts the common control information of the receiving sides in the PDCCH region, and/or puts the common control information of the receiving sides in the PDSCH region.

The receiving side obtains the common control information by receiving the RRC signaling sent by the network side or obtains the common control information through receiving or performing blind detection for the PDCCH, receives or performs blind detection for dedicated control information in the PDCCH region and/or the PDSCH region, or performs blind detection for the common control information in the PDSCH region.

When the network side configures to send the common control information in the PDSCH region, any one of the following three schemes may be applied:

the network side configures a common control information non-dedicated RRC signaling to indicate a receiving or blind detection region of the common control information and the dedicated control information;

the network side configures a common control information dedicated RRC signaling to indicate a receiving or blind detection region of the common control information;

the network side puts the common control information according to a PDSCH region configured fixedly by standards.

The receiving side may obtain the location of the common control information through a common control channel non-dedicated signaling, or a common control channel dedicated signaling, or a fixed region in the standards, so as to perform receiving or blind detection processing, wherein the non-dedicated RRC signaling refers to indicating a receiving or blind detection region of the common control information and the dedicated control information through a RRC signaling, while the dedicated RRC signaling refers to indicating a receiving or blind detection region of the common control information and the dedicated control information by applying different RRC signalings.

Figure 2:
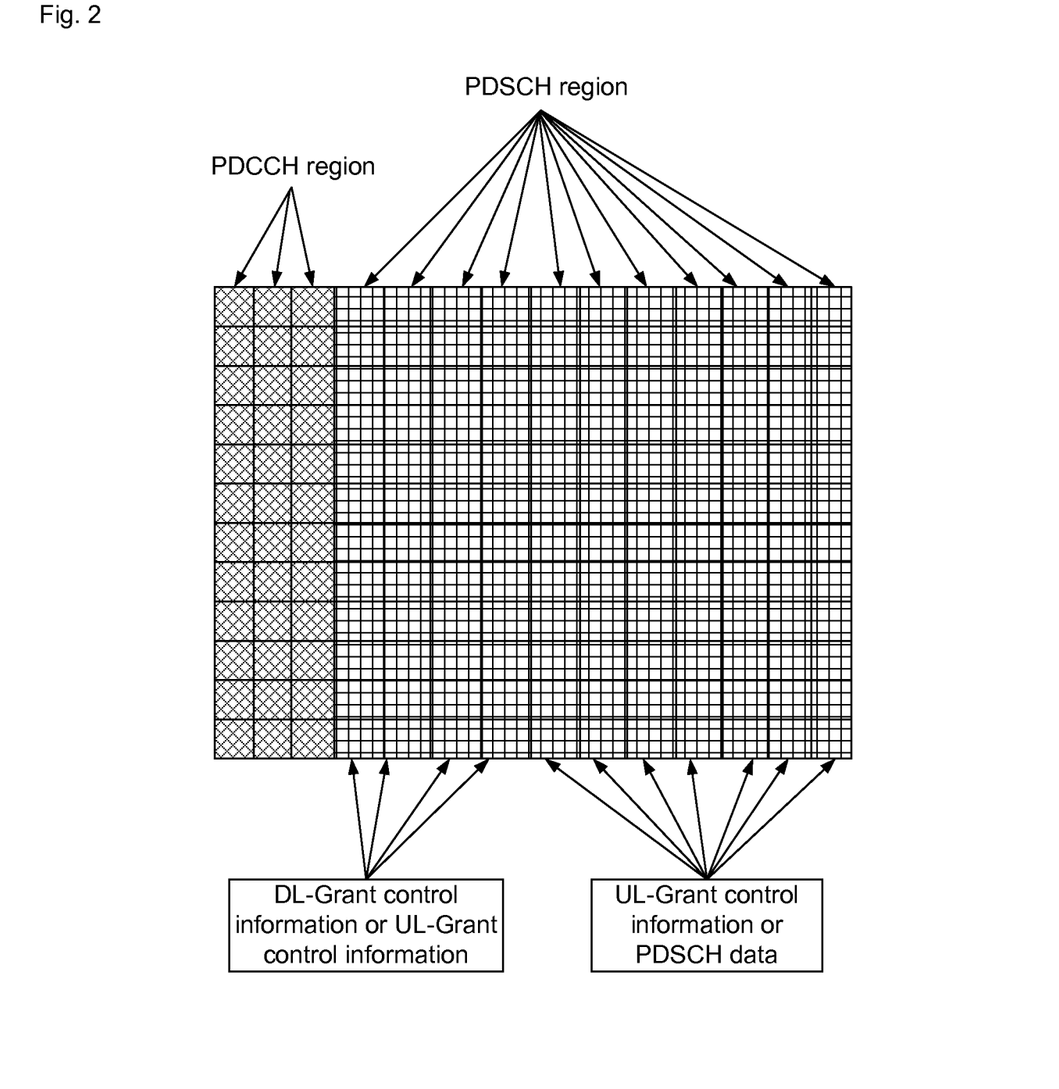
FIG. 2 is the second schematic diagram illustrating a configuration principle of a downlink control channel of an embodiment of the disclosure.
Figure 3:
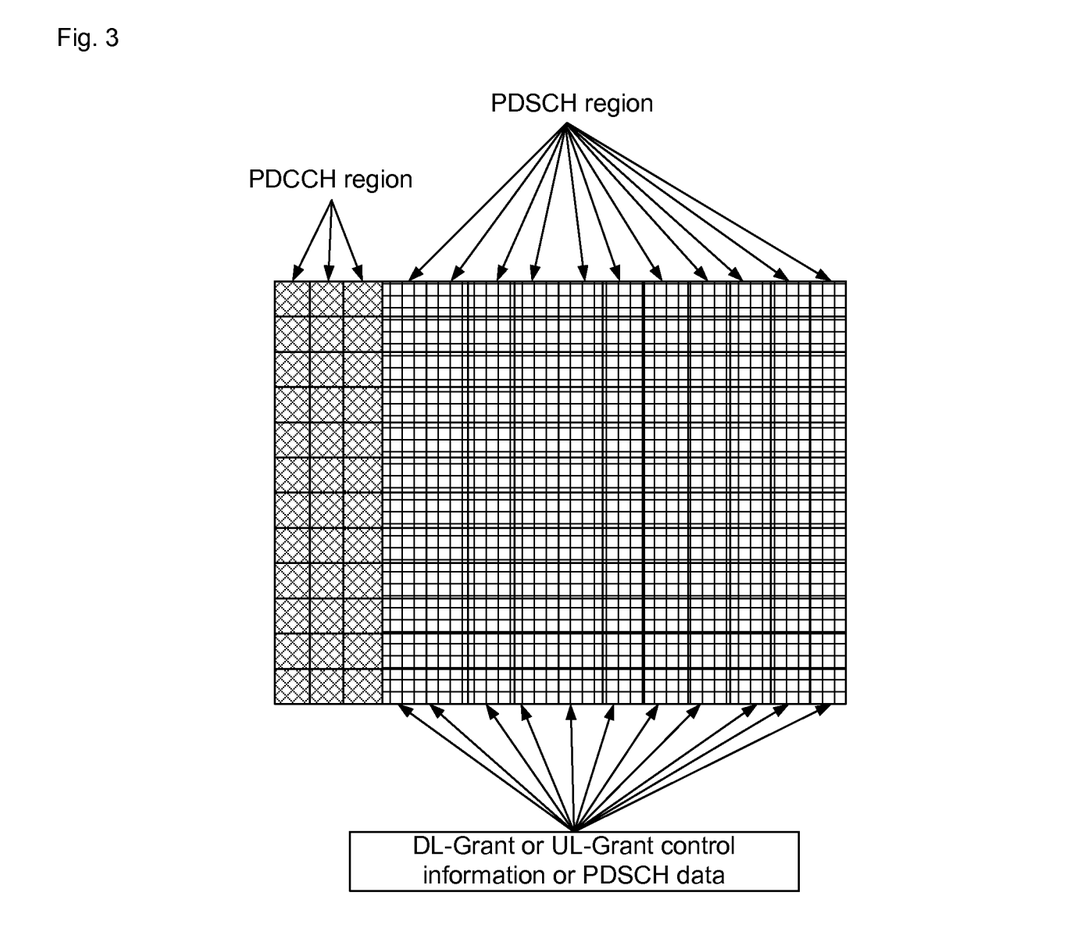
FIG. 3 is the third schematic diagram illustrating a configuration principle of a downlink control channel of an embodiment of the disclosure.

In addition, when configuring a control channel of the PDSCH region for the receiving side, the network side may apply a time domain length taking a slot as a unit, e.g. a subframe is divided into two slots on the time domain; a first slot and a second slot may respectively put different downlink control channel information or user data, or when configuring a control channel of the PDSCH region for the receiving side, the network side may further apply a time domain length taking a subframe as a unit, e.g. only one type of downlink control channel information or user data can be transmitted by a subframe on the time domain, as shown in FIG. 2 and FIG. 3.

The network side may send a DL-Grant and/or a UL-Grant on a first slot of the PDSCH region; or send the DL-Grant on the first slot of the PDSCH region and send the UL-Grant on a second slot; or send the DL-Grant on the first slot of the PDSCH region and send the UL-Grant in the PDCCH region; or send the UL-Grant in the PDCCH region and send the DL-Grant on two slots of the PDSCH region; or both the DL-Grant and the UL-Grant may be put on both the first slot and the second slot, and an allocated time domain granularity is a slot.

The disclosure will be described in details below through the embodiments and in combination with the accompanying drawings.

It should be noted that the common control information in the disclosure refers to the downlink control channel information which can be only put in a common search space in R8, R9 and/or R10, the dedicated control information refers to the downlink control channel information which may be put not only in a common search space, but also in a desiccated search space. The downlink control information at least includes one or more types of: DL-Grant, UL-Grant and common control information. The bitmap resource allocation scheme may directly indicates by using bit 0 and bit 1 in a full bandwidth RB, e.g. the number of full bandwidth RBs is 50, then by taking an RB as an allocation unit, 50 bit 0 and bit 1 are needed to indicate a resource allocation unit for transmitting an ePDCCH; or considering half an RB as an allocation unit, 50*2=100 bits are needed to indicate a resource allocation unit for transmitting an ePDCCH at the moment; or considering a quarter of an RB as an allocation unit, 50*2=100 bits are needed to indicate a resource allocation unit for transmitting an ePDCCH at the moment; when bitmap indication is applied, 0 may be used for indicating that a resource allocation unit is not used for transmitting an ePDCCH, and 1 is used for indicating that a resource allocation unit is used for transmitting an ePDCCH.

Embodiment 1

A receiving side of an advanced version always operates under a mode, or a network side notifies, through a RRC signaling, that the receiving side may operate under a mode. The receiving side under such a mode may not only receive or perform blind detection for downlink control channel information of a PDCCH region, but also receive or perform blind detection for downlink control channel information in a PDSCH region. The network side further needs to notify, through a RRC signaling or a SIBx (x=2 or 3) signaling, the receiving side of one or more types of following information of a downlink control channel of the PDSCH region which needs to be subjected to blind detection:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side of the advanced version always operates under such a mode, or the receiving side, by receiving a RRC signaling sent by the network side, adjusts the operating mode and obtains information required to receive or perform blind detection for the downlink control channel of the PDSCH region. In a downlink subframe configured as needed to be received or subjected to blind detection, the receiving side performs blind detection for downlink control channel information (at least including the blind detection to a common search space and a dedicated search space) in a PDCCH first, and then determines an ending location through a higher layer signaling notification or a scheme for detecting a PCFICH by using Table 2 (the time domain location of the downlink control channel information of the PDSCH region is indicated). Or an OFDM initial location of a PDSCH may be considered as 0 or a fixed non-zero value which is 1, 2, 3 or 4 on some special subframes (e.g. an ABS subframe). Determines the initial location and ending location of the PDSCH region, and then receives or performs blind detection for the downlink control channel information of the PDSCH region according to the information required to receive or perform blind detection for the downlink control channel. There are three situations at the moment: one situation is that the receiving side needs to perform blind detection for the downlink control channel information of the PDCCH region in any conditions, and also needs to perform blind detection for the downlink control channel information of the PDSCH region. Another situation is that, after the receiving side performs blind detection for the PDCCH region, the downlink control channel information of the PDSCH region may not be needed to perform blind detection if finding that the information obtained by the blind detection is consistent with an expected information or satisfies an expected condition. A third situation is that, after the receiving side performs blind detection for a PDCCH signaling and obtains some downlink control information, the obtained information may not be considered when performing blind detection for the PDSCH region, e.g. there is no need to perform blind detection for these information in the PDSCH region if DL-Grant or UL-Grant has been found during blind detection of the PDCCH region.

Embodiment 2

There are three situations for the location of common control information in a network side: one situation is that not only the common control information but also the dedicated control information may be put in a PDCCH region while only the dedicated control information can be put in a PDSCH region. A receiving side performs blind detection for the common control information and/or dedicated control information in the PDCCH region and only performs blind detection for the dedicated control information in the PDSCH region. The second situation is that not only the common control information but also the dedicated control information may be put in both the PDCCH region and the PDSCH region. The receiving side may perform blind detection for the common control information and/or dedicated control information in the PDCCH region and the PDSCH region.

The third situation is that the network side only puts the dedicated downlink control information in the PDSCH region and notifies, through a RRC signaling, the receiving side of the common control information. The receiving side only receives or performs blind detection for the dedicated control information in the PDSCH region, and the common control information may be obtained through receiving the RRC signaling sent by the network side. After obtaining the information, the receiving side may obtain corresponding downlink scheduling information and uplink scheduling information so as to perform a corresponding downlink receiving process or uplink sending process.

If the network side can transmit a common control channel in the PDSCH region, then the network side can further notify, through the same signaling (a non-dedicated RRC signaling or a PDCCH signaling), the receiving side of the time domain and/or frequency domain location of the common control channel and dedicated control channel in the PDSCH region, or configures a common control channel-dedicated time domain and/or frequency domain resource by a dedicated RRC signaling, or designates, in a standard, the time domain and/or frequency domain resource of a fixed common control channel in the PDSCH region.

The receiving side may obtain the time domain and/or frequency domain location of the common control channel through the notification of a common control channel non-dedicated signaling, or the notification of a common control channel-dedicated signaling, or according to the fixed time domain and/or frequency domain resource location in the standard, so as to perform receiving or blind detection processing.

Embodiment 3

A network side notifies, through a RRC signaling, a receiving side to choose to receive or perform blind detection for downlink control channel information in a PDCCH region or a PDSCH region. The network side further needs to notify, through a RRC signaling or a SIBx (x=2 or 3) signaling, the receiving side of one or more types of the following information of a downlink control channel of the PDSCH region which needs to be subjected to blind detection:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side adjusts a receiving or blind detection region of the downlink control information through receiving a RRC signaling sent by the network side and obtains information required to receive or perform blind detection for downlink control channel information in a downlink control channel of the PDSCH region. When configured to perform blind detection in the PDCCH region, in a downlink subframe configured as needed to be subjected to blind detection, the receiving side performs blind detection for downlink control channel information (at least including blind detection for a common search space and/or a dedicated search space) of the PDCCH region according to a scheme of R8, R9 and/or R10. When configured to perform blind detection in the PDSCH region, in the downlink subframe configured as needed to be subjected to blind detection, the receiving side receives or performs blind detection for the downlink control channel information (at least including the common control information and/or dedicated control information) of the PDSCH region according to information required to receive and perform blind detection for a downlink control channel. At the moment, the aggregation level of the control channel information may take a Resource Element Group (REG) or a Resource Block (RB) as a unit and may apply an interleaving manner or a non-interleaving manner.

Embodiment 4

A network side notifies, through a RRC signaling, a receiving side to choose to receive or perform blind detection for downlink control channel information in a PDCCH region or a PDSCH region. The network side further needs to notify, through a RRC signaling or a SIBx (x=2 or 3) signaling, the receiving side of information required to receive or perform blind detection for a downlink control channel of the PDSCH region which needs to be received or subjected to blind detection, at least including one or more types of the following information:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side adjusts a receiving or blind detection region of the downlink control information through receiving a RRC signaling sent by the network side and obtains information required to receive or perform blind detection for downlink control channel information in a downlink control channel of the PDSCH region. When configured to perform blind detection in the PDCCH region, in a downlink subframe configured as needed to be subjected to blind detection, the receiving side performs blind detection for downlink control channel information (at least including blind detection for a common search space and a dedicated search space) of the PDCCH region according to a scheme of R8, R9 and/or R10. When configured to perform blind detection in the PDSCH region, in the downlink subframe configured as needed to be subjected to blind detection, the receiving side receives or performs blind detection for the downlink common control information of the PDCCH region according to information required to receive and perform blind detection for a downlink control channel, and receives or performs blind detection for downlink dedicated control channel information of the PDSCH region. At the moment, the aggregation level of a control channel of the PDSCH region may take an REG or an RB as a unit and may apply an interleaving manner or a non-interleaving manner.

Embodiment 5

When a receiving side adjusts a operating mode through receiving a RRC signaling sent by a network side, or a receiving side of an advanced version receives or performs blind detection for downlink control channel information in a PDSCH region, in the downlink subframe configured as needed to be subjected to blind detection, the receiving side performs blind detection for a PCFICH of a PDCCH region first, determines the number of OFDM symbols occupied by the PDCCH region to determine an OFDM Initial location of the PDSCH, and then determines an ending location by using Table 2 (indicating the time domain location of the downlink control channel information of the PDSCH region). Or the OFDM Initial location of the PDSCH may be considered as 0 or a fixed non-zero value (1, 2, 3 or 4) on some special subframes (e.g. an ABS subframe).

TABLE 2

| | Downlink control information OFDM symbol initial location of the PDSCH region | Downlink control information OFDM symbol ending location of the PDSCH region |
| --- | --- | --- |
| Normal Cyclic Prefix (CP) subframe | 0 or a fixed non-zero value or a PCFICH indication value (1, 2, 3 or 4) or 6 | 6 or 13 |
| Extended CP subframe | 0 or a fixed non-zero value or a PCFICH indication value (1, 2, 3 or 4) or 7 | 5 or 11 |

Embodiment 6

A network side notifies, through a RRC signaling, a receiving side to choose to receive or perform blind detection for downlink control channel information in a PDCCH region or a PDSCH region. The network side further needs to notify, through a RRC signaling or a SIBx (x=2 or 3) signaling, the receiving side of information required to receive or perform blind detection for a downlink control channel of the PDSCH region which needs to be received or subjected to blind detection, specifically at least including one or more types of the following information:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side adjusts a blind detection region of the downlink control information through receiving a RRC signaling sent by the network side and obtains the frequency domain location of the downlink control channel information in the PDSCH region. When configured to perform blind detection in the PDCCH region, in a downlink subframe configured as needed to be subjected to blind detection, the receiving side performs blind detection for downlink control channel information (at least including blind detection for a common search space and a dedicated search space) of the PDCCH region according to a scheme of R8, R9 and/or R10. When configured to perform receiving or blind detection in the PDSCH region, in a downlink subframe configured as needed to be received or subjected to blind detection, the receiving side performs blind detection for a PCFICH first, obtains an OFDM initial location of the PDSCH region, determines an ending location by using Table 2 or determines the initial and ending location by using Table 2 directly on a special subframe (e.g. an ABS subframe) or determines the initial and/or ending location of the PDSCH region through a higher layer signaling, and then performs blind detection for the downlink control channel information (at least including a common control information and/or dedicated control information) of the PDSCH region. At the moment, the aggregation level of the control channel information may take an REG or an RB as a unit and may apply an interleaving manner or a non-interleaving manner.

Embodiment 7

A network side notifies, through a RRC signaling, a receiving side to choose to perform blind detection for downlink control channel information in a PDCCH region or a PDSCH region. The network side further needs to notify, through a RRC signaling or a SIBx (x=2 or 3) signaling, the receiving side of information required to receive or perform blind detection for a downlink control channel of the PDSCH region which needs to be received or subjected to blind detection, specifically at least including one or more types of the following information:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side adjusts a blind detection region of the downlink control information through receiving a RRC signaling sent by the network side and obtains the frequency domain location of the downlink control channel information in the PDSCH region. When configured to perform blind detection in the PDCCH region, in a downlink subframe configured as needed to be subjected to blind detection, the receiving side performs blind detection for downlink control channel information (at least including blind detection for a common search space and a dedicated search space) of the PDCCH region according to a scheme of R8, R9 and/or R10. When configured to perform receiving or blind detection in the PDSCH region, in a downlink subframe configured as needed to be received or subjected to blind detection, the receiving side performs blind detection for a PCFICH first, obtains an initial location of the PDSCH region, determines an ending location by using Table 2 or determines the initial and ending location by using Table 2 directly on a special subframe (e.g. an ABS subframe) or determines the initial and/or ending location of the PDSCH region through a higher layer signaling, and then performs blind detection for the downlink common control information of the PDCCH region in a downlink subframe of common control information which needs to be subjected to blind detection, and finally performs blind detection for downlink dedicated control channel information of the PDSCH region. At the moment, the aggregation level of the control channel information may take an REG or an RB as a unit and may apply an interleaving manner or a non-interleaving manner.

Embodiment 8

A network side notifies, through a RRC signaling, a receiving side to choose to perform blind detection for downlink control channel information in a PDCCH region or a PDSCH region. The network side further needs to notify, through a RRC signaling or a SIBx (x=2 or 3) signaling, the receiving side of information required to receive or perform blind detection for a downlink control channel of the PDSCH region which needs to be received or subjected to blind detection, specifically at least including one or more types of the following information:

the time domain and/or frequency domain location (at least including a resource allocation type and resource time domain and/or frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

A scheme for notifying the frequency domain location of the PDSCH region needed to be received or subjected to blind detection may apply a resource allocation scheme Type0, Type1 or Type2 in 36.213, or a bitmap resource indication scheme.

The receiving side adjusts a blind detection region of the downlink control information through receiving a RRC signaling sent by the network side and obtains the frequency domain location of the downlink control channel information in the PDSCH region. When configured to perform blind detection in the PDCCH region, in a downlink subframe configured as needed to be subjected to blind detection, the receiving side performs blind detection for downlink control channel information (at least including blind detection for a common search space and a dedicated search space) of the PDCCH region according to a scheme of R8, R9 and/or R10. When configured to perform receiving or blind detection in the PDSCH region, in a downlink subframe configured as needed to be received or subjected to blind detection, the receiving side performs blind detection for a PCFICH first, obtains an initial location of the PDSCH region, determines an ending location by using Table 2 or determines the initial and ending location by using Table 2 directly on a special subframe (e.g. an ABS subframe) or determines the initial and/or ending location of the PDSCH region through a higher layer signaling, and then performs blind detection for the downlink dedicated control channel information of the PDSCH region. At the moment, the aggregation level of the control channel information may take an REG or an RB as a unit and may apply an interleaving manner or a non-interleaving manner. The receiving side under such a mode may obtain common control information through a RRC signaling sent by network.

Embodiment 9

A receiving side of an advanced version or a network side notifies, through a RRC signaling, a receiving side that the receiving side may operate under a mode. The receiving side under such a operating mode may perform blind detection for not only the downlink control channel information of a PDCCH region but also the downlink control channel information of a PDSCH region.

When configured as needed to receive or perform blind detection for the PDSCH region, the receiving side operating under the above mode performs blind detection for a PCFICH first to determine an initial symbol for the PDSCH, determines an ending location by using Table 2, or determines the initial and ending location by using Table 2 directly on a special subframe (e.g. an ABS subframe), or determines the initial and ending location through a higher layer signaling (RRC, SIBx), or determines the initial and/or ending location of the PDSCH region through a higher layer signaling, then performs blind detection for primary control information in a PDCCH, wherein one or more types of the following information required to receive or perform blind detection for secondary control information of the PDSCH region are included:

the frequency domain location (at least including a resource allocation type and resource frequency domain location information) occupied by the control channel which needs to be received or subjected to blind detection;

a modulation and coding scheme of the control channel which needs to be received or subjected to blind detection;

a transmission mode of the control channel which needs to be received or subjected to blind detection;

a DMRS antenna port number of the control channel which needs to be received or subjected to blind detection;

a DMRS scrambling code identifier of the control channel which needs to be received or subjected to blind detection;

an identifier of the number of DMRS layers of the control channel which needs to be received or subjected to blind detection;

a carrier indication identifier of the control channel which needs to be received or subjected to blind detection;

an aggregation level of the control channel which needs to be received or subjected to blind detection.

After performing blind detection for the primary control information, the secondary control information is obtained according to the indication in the primary control information, wherein the frequency domain location indication in the primary control information may apply a resource allocation scheme Type0, Type1 or Type2, or a bitmap resource indication scheme.

The network side may also pre-allocate a frequency domain resource to the receiving side through a RRC signaling or a SIBx (x=2 or 3) signaling. Such resource allocation may also apply the resource allocation scheme Type0, Type1, Type2 or the bitmap resource indication scheme. When configured that there is need to receive or subject to blind detection, the primary control information in the PDCCH is subjected to blind detection first. After receiving or performing blind detection for the primary control information, the information required to receive or perform blind detection for the secondary control information is obtained according to the indication in the primary control information, wherein the frequency domain location indication in the primary control information may apply the Type0, Type1, Type2 or bitmap resource allocation scheme. For the bitmap resource allocation scheme, the resource location corresponding to the secondary control information in the pre-allocated frequency domain resource is indicated by bit 0 and bit 1.

For any one of the embodiments above, a network side may only send the DL-Grant on the first slot of a PDSCH and send the UL-Grant in a PDCCH region; a receiving side configured to receive a control channel in a PDSCH region may receive or perform blind detection for the UL-Grant in the PDCCH region and receive the DL-Grant on the first slot of the PDSCH region; or a network side may send the DL-Grant on the first slot of the PDSCH, send the UL-Grant on the first slot of the PDSCH and receive the DL-Grant on the first slot of the PDSCH region; or a network side may send the DL-Grant and/or UL-Grant on the first slot of the PDSCH, or put both the DL-Grant and UL-Grant on the first slot and a second slot; an allocated time domain granularity is a slot.

Figure 4:
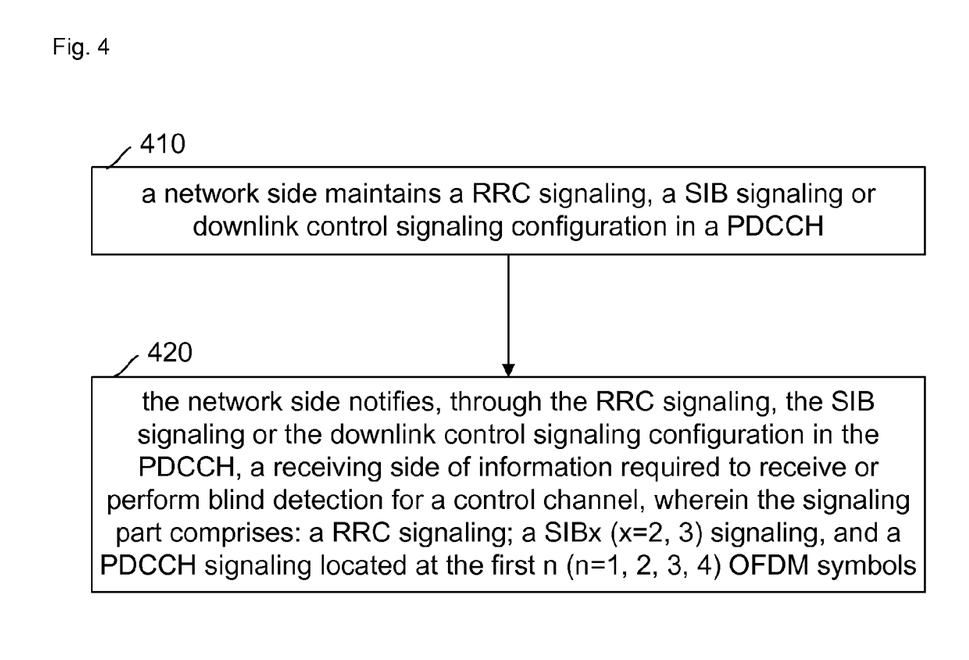
FIG. 4 is a simple flowchart illustrating control channel information processing of an embodiment of the disclosure.

It can be learned by combining the embodiments above that the operation approach for processing control channel information of the disclosure may be represented by the process as shown in FIG. 4. The process at least includes the following steps:

Step 410: a network side maintains a RRC signaling, a SIB signaling or downlink control signaling configuration in a PDCCH;

Step 420: the network side notifies, through one or more types of the following signalings, a receiving side of the information required to receive a control channel, wherein the signaling part at least includes:

a RRC signaling;

a SIBx (x=2, 3) signaling; and a PDCCH signaling located at the first n (n=1, 2, 3, 4) OFDM symbols, wherein the information required to receive or to perform blind detection for the control channel at least includes one or more types of the following information:

a signaling indicating that a receiving side may receive a downlink control information in a PDSCH region;

the time domain or frequency domain location (at least including a resource allocation type and resource time domain or frequency domain location information) occupied by the control channel which needs to be received;

a modulation and coding scheme of the control channel which needs to be received;

a transmission mode of the control channel which needs to be received;

a DMRS antenna port number of the control channel which needs to be received;

a DMRS scrambling code identifier of the control channel which needs to be received;

an identifier of the number of DMRS layers of the control channel which needs to be received;

a carrier indication identifier of the control channel which needs to be received;

an aggregation level of the control channel which needs to be received.

Figure 5:
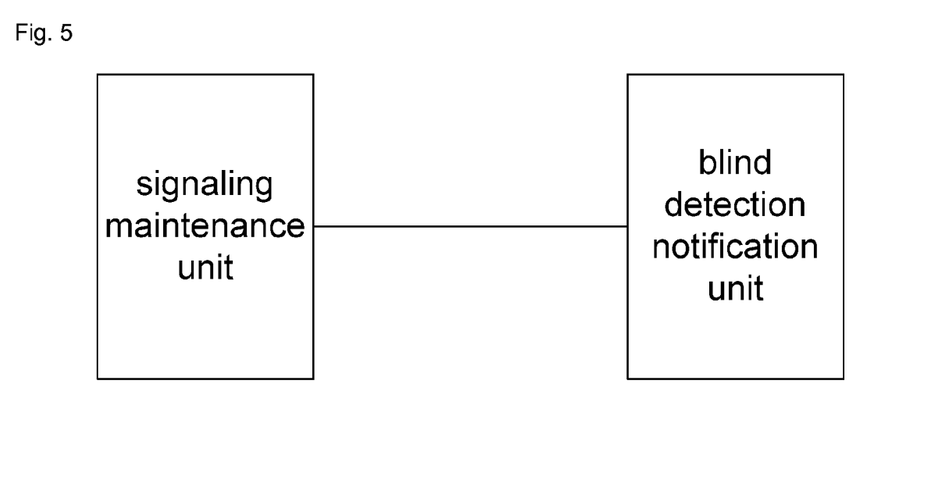
FIG. 5 is a diagram illustrating a system for processing control channel information of an embodiment of the disclosure.

In order to ensure that the above embodiments and operation approach can be implemented smoothly, settings as shown in FIG. 5 may be applied. As shown in FIG. 5, which is a diagram illustrating a system for processing control channel information of an embodiment of the disclosure, the system at least includes a signaling maintenance unit and a blind detection notification unit connected with each other. Both the two units can be set on a network side. It will be appreciated that invention is implemented by means of one or more pieces of circuitry, for example a processor executing a stored program in memory or a field-programmed gate array or an application-specific integrated circuit. Thus for example the signaling maintenance unit and the blind detection notification unit may be implemented in such a way.

During practical application, the signaling maintenance unit can maintain a RRC signaling, a SIB signaling or downlink control signaling configuration in a PDCCH. The receiving or blind detection notification unit can notify, through the maintained RRC signaling, SIB signaling or the downlink control signaling configuration in the PDCCH, a receiving side of the information required to receive or perform blind detection for a control channel.

Of course, a receiving or blind detection execution unit may be further set to perform subsequent receiving or blind detection processing. The receiving or blind detection execution unit may be set on a receiving side corresponding to the network side.

To sum up, no matter the method or the system, in the control channel information processing technology of the disclosure, the receiving side can be notified via signaling configuration of the time domain and/or frequency domain location occupied by the control channel. This scheme allows for full utilization of space division technology, thus reducing the load on a physical downlink control channel, and reducing interference between control channels.

The above are only preferred embodiments of the disclosure and not intended to limit the scope of protection of the disclosure.

The invention claimed is:

1. A method for processing control channel information, comprising:

notifying a receiving side, by a network side via one or more signaling, of information required for control channel reception or blind-detection;

wherein the signaling comprises:

a Radio Resource Control (RRC) signaling, a System Information Block (SIB)x signaling, where x is equal to 2 or 3, and a Physical Downlink Control Channel (PDCCH) signaling located at first n Orthogonal Frequency-Division Multiplexing (OFDM) symbols, where n is equal to 1, 2, 3 or 4;

wherein the information required by the receiving side for control channel reception or blind-detection comprises one or more of the following:

at least one of a time domain or frequency domain location occupied by the control channel which needs to be received or subjected to blind detection, which contains a resource allocation type and at least one of resource time domain or frequency domain location information;

a modulation and coding scheme of the control channel which needs to be received or subjected to blind detection;

a transmission mode of the control channel which needs to be received or subjected to blind detection;

a demodulation reference signals (DMRS) antenna port number of the control channel which needs to be received or subjected to blind detection;

a DMRS scrambling code identifier of the control channel which needs to be received or subjected to blind detection;

an identifier of a number of DMRS layers of the control channel which needs to be received or subjected to blind detection;

a carrier indication identifier of the control channel which needs to be received or subjected to blind detection;

an aggregation level of the control channel which needs to be received or subjected to blind detection.

2. The method according to claim 1, wherein the notifying comprises at least one of the following:

notifying a receiving side to receive or perform blind detection for downlink control information at least in a PDCCH region or a Physical Downlink Shared Channel (PDSCH) region;

notifying, by the network side through the RRC signaling, the receiving side to receive or perform blind detection for the downlink control information in the PDCCH or PDSCH region; or notifying, by the network side through the RRC signaling or the SIBx signaling, the receiving side of the information required by the control channel which needs to be received or subjected to blind detection.

3. The method according to claim 2, wherein when the network side notifies the receiving side through the RRC signaling or the SIBx signaling, the network side further notifies, through a resource allocation scheme Type 0, Type 1 or at least Type 2 or a bitmap scheme, the receiving side of the frequency domain location of the control information which needs to be received or subjected to blind detection in the PDSCH region.

4. The method according to claim 1, wherein the notifying comprises at least one of the following:
indicating, by the network side through a higher layer signaling, the receiving side of the time domain location of the downlink control information which needs to be received or subjected to blind detection in the PDSCH;
indicating, by the network side through a higher layer signaling, the receiving side of an OFDM initial location of the downlink control information which needs to be received or subjected to blind detection in the PDSCH time domain location;
notifying, by the network side through a Physical Control Format Indicator Channel (PCFICH) signaling, the receiving side of the time domain location of the downlink control information which needs to be received or subjected to blind detection in the PDSCH; determining, by the receiving side through receiving or performing blind detection for a PCFICH, a beginning OFDM symbol of the downlink control information of the PDSCH region;
determining, by the network side, the beginning OFDM symbol or a last OFDM symbol of the downlink control information based on a location of the beginning or last OFDM symbol in a slot, or determining the OFDM initial or ending symbol of the downlink control information by the initial or ending OFDM symbol location in a subframe.

5. The method according to claim 1, wherein the notifying comprises:
notifying, by the network side, the receiving side of the control information through configuring two levels of downlink control information; obtaining, by the receiving side through receiving or performing blind detection for a primary control signaling in a PDCCH, the information required to receive or perform blind detection for a secondary downlink control channel in the PDSCH region, wherein the information required to perform blind detection for secondary control information is the same as or a sub-set of the information required by the receiving side to receive or perform blind detection for the control channel.

6. The method according to claim 1, wherein the method further comprises:
notifying, when the network side sends common control information to receiving sides which are provided with or configured to receive or perform blind detection for the control information on a PDSCH, these receiving sides of corresponding common control information at least through the RRC signaling; putting the common control information of the receiving sides in the PDCCH region; or, putting the common control information of the receiving sides in the PDSCH region;
obtaining, by the receiving side, the common control information through receiving the RRC signaling sent by the network side, or obtaining the common control information through receiving or performing blind detection for the PDCCH, receiving or performing blind detection for a dedicated control information at least in the PDCCH region or the PDSCH region, or performing blind detection for the common control information in the PDSCH region.

7. The method according to claim 6, wherein the method further comprises:
applying any one of the following three approaches when the network side configures the common control information to be sent in the PDSCH region:
indicating, by the network side through configuring a common control information non-dedicated RRC signaling, a receiving or blind detection region of the common control information and the dedicated control information;
indicating, by the network side through configuring a common control information dedicated RRC signaling, a receiving or blind detection region of the common control information;
placing, by the network side, the common control information according to a fixed PDSCH region configured by a standard;
further obtaining, by the receiving side, the location of the common control information through a common control channel non-dedicated signaling, or a common control channel dedicated signaling, or a fixed region in the standard, so as to perform the reception or blind detection.

8. The method according to claim 1, wherein the method further comprises:
configuring, by the network side, a time domain length of the control channel of the PDSCH region by taking a slot or a subframe as a unit.

9. A system for processing control channel information, wherein the system at least comprises a signaling maintenance unit, and a receiving or blind detection notification unit, wherein
the signaling maintenance unit is configured to maintain downlink control signaling configuration in a PDCCH, a RRC signaling or a SIB signaling;
the receiving or blind detection notification unit is configured to, through the maintained downlink control signaling configuration, the RRC signaling or the SIB signaling in the PDCCH, notify a receiving side of information required to receive or perform blind detection for a control channel;
wherein the signaling maintenance unit and the receiving or blind detection notification unit are each the result of execution on a processor of instructions stored in a memory;
wherein the signaling part comprises at least:
a RRC signaling,
a SIBx (x=2, 3) signaling, and
a PDCCH signaling located at the first n (n=1, 2, 3, 4) OFDM symbols;
wherein the information required by the receiving side to receive or perform blind detection for the control channel at least comprises one or more types of the following information:
at least the time domain or frequency domain location occupied by the control channel which needs to be received or subjected to blind detection, wherein at least comprises a resource allocation type and at least resource time domain or frequency domain location information;
a modulation and coding scheme of the control channel which needs to be received or subjected to blind detection;
a transmission mode of the control channel which needs to be received or subjected to blind detection;
a DMRS antenna port number of the control channel which needs to be received or subjected to blind detection;

a DMRS scrambling code identifier of the control channel which needs to be received or subjected to blind detection;
an identifier of the number of DMRS layers of the control channel which needs to be received or subjected to blind detection;
a carrier indication identifier of the control channel which needs to be received or subjected to blind detection;
an aggregation level of the control channel which needs to be received or subjected to blind detection.

10. The system according to claim 9, wherein when notifies, the receiving or blind detection notification unit is configured to at least:
notifying a receiving side to receive or perform blind detection for downlink control information at least in a PDCCH region or a PDSCH region;
trigger the network side to notify, through the RRC signaling, the receiving side that the receiving side is needed to receive or perform blind detection for the downlink control information in the PDCCH region, or receive or perform blind detection for the downlink control information in the PDSCH region;
trigger the network side to notify, through the RRC signaling or the SIBx (x=2,3) signaling, the receiving side of the information required by the downlink control information which needs to be received or subjected to blind detection;
the information required to receive or perform blind detection for the downlink control information at least comprises one or more types of the following information:
at least the time domain or frequency domain location occupied by the control channel which needs to be received or subjected to blind detection, wherein at least comprises a resource allocation type and at least resource time domain or frequency domain location information;
a modulation and coding scheme of the control channel which needs to be received or subjected to blind detection;
a transmission mode of the control channel which needs to be received or subjected to blind detection;
a DMRS antenna port number of the control channel which needs to be received or subjected to blind detection;
a DMRS scrambling code identifier of the control channel which needs to be received or subjected to blind detection;
an identifier of the number of DMRS layers of the control channel which needs to be received or subjected to blind detection;
a carrier indication identifier of the control channel which needs to be received or subjected to blind detection;
an aggregation level of the control channel which needs to be received or subjected to blind detection.

11. The system according to claim 10, wherein when performing the notification through the RRC signaling or the SIBx (x=2, 3) signaling, the network side is further configured to notify, through a resource allocation scheme Type 0, Type 1 or Type 2 or a bitmap scheme, the receiving side of the frequency domain location of the downlink control information which needs to be received or subjected to blind detection in the PDSCH region.

12. The system according to claim 9, wherein when notifies, the receiving or blind detection notification unit is configured to at least:
trigger the network side to indicate, through a higher layer signaling, the receiving side of the time domain location of the downlink control information which needs to be received or subjected to blind detection in the PDSCH;
trigger the network side to indicate, through a higher layer signaling, the receiving side of an OFDM initial location of the downlink control information which needs to be received or subjected to blind detection in the PDSCH time domain location;
trigger the network side to notify, through a PCFICH signaling, the receiving side of the time domain location of the downlink control information which needs to be received or subjected to blind detection in the PDSCH, and trigger the receiving side to determine, through receiving or performing blind detection for a PCFICH, an OFDM initial symbol of the control information of the PDSCH region; or
trigger the network side to determine the OFDM initial symbol or an OFDM ending symbol of the downlink control information by the initial or ending OFDM symbol location of a slot, or determine the OFDM initial or ending symbol of the downlink control information by the initial or ending OFDM symbol location of a subframe.

13. The system according to claim 9, wherein when notifies, the receiving or blind detection notification unit is configured to:
trigger a network side to notify a downlink control information format to the receiving side through configuring two levels of downlink control information; trigger the receiving side to obtain, through receiving and performing blind detection for a primary control signaling in a PDCCH, one or more types of the following information of secondary downlink control information which needs to be subjected to blind detection in the PDSCH region:
the time domain or frequency domain location occupied by the control channel which needs to be received or subjected to blind detection, wherein at least comprises a resource allocation type and at least resource time domain or frequency domain location information;
a modulation and coding scheme of the control channel which needs to be received or subjected to blind detection;
a transmission mode of the control channel which needs to be received or subjected to blind detection;
a DMRS antenna port number of the control channel which needs to be received or subjected to blind detection;
a DMRS scrambling code identifier of the control channel which needs to be received or subjected to blind detection;
an identifier of the number of DMRS layers of the control channel which needs to be received or subjected to blind detection;
a carrier indication identifier of the control channel which needs to be received or subjected to blind detection;
an aggregation level of the control channel which needs to be received or subjected to blind detection.

14. The system according to claim 9, wherein the network side is further configured to:
when sending a common control information to receiving sides which are provided with or configured to receive or perform blind detection for the downlink control information on a PDSCH, at least notify these receiving sides of corresponding common control information through the RRC signaling, put the common control information of the receiving sides in the PDCCH region, or put the common control information of the receiving sides in the PDSCH region;

trigger the receiving side to obtain the common control information through receiving the RRC signaling sent by the network side, or obtain the common control information through receiving or performing blind detection for the PDCCH, receive or perform blind detection for a dedicated control information at least in the PDCCH region or the PDSCH region, or perform blind detection for the common control information in the PDSCH region.

15. The system according to claim 14, wherein the network side is further configured to:
apply any one of the following three schemes when the common control information is configured to be sent in the PDSCH region:
indicate, through configuring a common control information non-dedicated RRC signaling, a receiving or blind detection region of the common control information and the dedicated control information;
indicate, through configuring a common control information dedicated RRC signaling, a receiving or blind detection region of the common control information;
put the common control information according to a PDSCH region configured fixedly by a standard;
trigger the receiving side to obtain the location of the common control information through a common control channel non-dedicated signaling, or a common control channel dedicated signaling, or a fixed region in the standard, so as to perform receiving or blind detection processing.

16. The system according to claim 9, wherein the network side is further configured to:
configure a control channel of the PDSCH region for the receiving side by applying a time domain length taking a slot or a subframe as a unit.

* * * * *